March 29, 1960 M. H. HOLLINGSWORTH 2,930,857

SPECTACLES CONCEALED HEARING-AID

Filed Dec. 31, 1953 5 Sheets-Sheet 1

INVENTOR

M. H. Hollingsworth

BY [signature]

ATTORNEY

SPECTACLES CONCEALED HEARING-AID

Filed Dec. 31, 1953 5 Sheets-Sheet 2

INVENTOR

M. H. Hollingsworth

BY

ATTORNEY

March 29, 1960 M. H. HOLLINGSWORTH 2,930,857

SPECTACLES CONCEALED HEARING-AID

Filed Dec. 31, 1953 5 Sheets-Sheet 3

INVENTOR.
M. H. HOLLINGSWORTH

BY [signature]

ATTORNEY

March 29, 1960 M. H. HOLLINGSWORTH 2,930,857

SPECTACLES CONCEALED HEARING-AID

Filed Dec. 31, 1953 5 Sheets-Sheet 4

INVENTOR.
M. H. HOLLINGSWORTH
BY
ATTORNEY

March 29, 1960 M. H. HOLLINGSWORTH 2,930,857

SPECTACLES CONCEALED HEARING-AID

Filed Dec. 31, 1953 5 Sheets-Sheet 5

ELECTRIC SYMBOLS
C = CAPACITORS
R = RESISTORS
VR = VARIABLE RESISTORS
T = TRANSFORMERS
TR = TRANSISTORS
l = PLATES
c = COLLECTORS
e = EMITTERS

INVENTOR.
M. H. HOLLINGSWORTH
BY [signature]
ATTORNEY

United States Patent Office 2,930,857
Patented Mar. 29, 1960

2,930,857

SPECTACLES CONCEALED HEARING-AID

Maurice H. Hollingsworth, Corpus Christi, Tex.; Eleanor Hollingsworth, executrix of said Maurice H. Hollingsworth, deceased, assignor to Eleanor Humphries (formerly Eleanor Hollingsworth)

Application December 31, 1953, Serial No. 401,629

11 Claims. (Cl. 179—107)

This invention relates to hearing-aid devices and more particularly relates to improvements in hearing-aids wherein the component parts are inconspicuously and operatively incorporated within the frame of spectacles, this application being a continuation-in-part of my pending application for patent, Ser. No. 196,657, filed November 20, 1950, now abandoned.

From the beginning, many of the hard-of-hearing have not used a hearing-aid because the hearing-aid is conspicuous and many of the hard-of-hearing victims are sensitive to advertising their disability by wearing a hearing-aid that is conspicuous. This has been so since the beginning of the use of any hearing-aid apparatus, fifty or more years ago.

The electronic hearing-aids now in use are all quite similar. The microphone, tubes, batteries, transformer (if present) and the on-and-off and volume control switch are enclosed in a rectangular housing or case about three inches by two and a half inches and three-eights of an inch or possibly one-half inch thick over-all. Some smaller sized assemblies are now just on the market and still smaller assemblies are soon to be announced. Nevertheless, such enclosure or case containing the several parts is concealed in the closing of the user and, often, it is only partly concealed for better reception. There is always a noise due to the friction of clothing rubbing over the case. From the case or housing, a wire runs to a receiver usually held against the mastoid temporal bone of the user (bone conduction) or to a receiver from which a hollow plastic tube (air conduction) runs to the ear and opens into the canal of the ear, being held in place by a mass of semi-transparent plastic material that is molded to fit into the ear. The receiver may be carried directly by the molded plastic ear piece, in which case the hollow plastic tube is not used.

All this is extremely conspicuous, particularly so when the receiver is simply inserted in the ear and held in place by the molded ear piece. In the case of bone conduction, the prevailing practice is to hold the receiver against the skull just back of the middle of the ear by means of of a head band; although recently, a receiver has been designed successfully to stay in place by being cemented to the skin.

Several proposals have been made for incorporating a hearing-aid in the frame of spectacles, but these are ineffective, for their purpose because of their construction and/or arrangement of the hearing-aid instrumentalities.

Having in mind the deficiencies of the prior art, the principal and broad object of this invention is to provide a hearing-aid device wherein all of the several components of an electrical hearing-aid are operatively and totally combined or incapsulated within the defined design of a conventional spectacles frame so as to be concealed thereby and in a manner giving to the user the most efficient advantage of the acoustical properties of said hearing-aid, thus packaged, by positioning the microphone and receiver therein more naturally in the rear end portion of the temple pieces, respectively, of the frame for maximum acoustical efficiency without annoying or discomforting distortions; and, in the case of a hearing-aid of the air-conduction type, to so mount such elements as just stated with the receiver concealed in the spectacles frame and having a very short and thin and very inconspicuous air tube extending from a rear end portion of a temple-piece or bow of the spectacles frame into the ear of the wearer.

Another important object of the present invention is to so dispose the bone-conduction-receiver of a hearing-aid in a frame of spectacles entirely within the rear end portion of one of its bows or temple-pieces to contact the mastoid bone in back of the ear and to employ the large area of the bow to press against the flesh overlying the mastoid bone, thereby relieving the area of contact from concentrated pressure over the smaller area afforded by the receiver itself; and, in such cases where greater pressure contact is desired, to build-up the inner contacting surface of the rear end of the bow as by means of a pad of suitable material applied thereto.

Still another and important object of the invention is to so dispose the microphone of a hearing-aid in the rear end portion of the other bow or temple-piece of a spectacles frame to be adjacent an ear of the wearer so as to place the microphone in a more natural hearing or sound "pick-up" position remote from the vicinity of the wearer's mouth and nose, thus eliminating deafening and annoying sounds caused by his breathing or coughing or by his own voice, when speaking, and enabling him to use a telephone receiving instrument in the same manner as persons having normal hearing without the need of additional amplifying attachments to the telephone receiver.

It is also an object of the invention to provide an improved hinge construction between the frontal piece and the temple-pieces or bows of a spectacles frame, the frontal piece having an enlarged material mass at its ends to which the front ends of the bows are hinged, respectively, to provide definite stop abutments to the movement of the bows from their unfolded position, thus definitely limiting the open position of the bows to effect and maintain a desired degree of pressure contact of the rear ends of the bows (when the spectacles are worn) against the mastoid bone of the wearer so that the bow carrying the receiver will be properly held thereagainst; the adjacent abutting surface of the hinged end of the bow and of the frontal piece having spring terminal members molded therein, respectively, and being recessed to house resiliently yieldable contacing end portions of said terminals in a manner whereby said contacting portions wipe one over the other during their opening and closing movements effected by relative movement between the bows and frontal piece to establish good electrical contact, when the bows are open and to break or open the circuit when the bows are in folded position.

A still further object of the invention is to provide an improved hearing-aid device in the form of a spectacles frame wherein the bows and frontal piece thereof are composed of separable longitudinal sections formed with internal cavities or recesses to receive and accommodate the various instrumentalities of an electrical hearing-aid system, which sections may be separated to give access to the said instrumentalities for replacement or repair; and, further, to provide a novel means for mounting and containing an electric battery within said spectacles frame so that it may be quickly plugged into the hearing-aid system and removed therefrom.

The objects of the present invention are accomplished by the construction and arrangement of parts hereinafter fully described; and the invention, accordingly, consists in the combinations of elements, arrangements of parts and in the sundry detail features of construction hereinafter described and pointed out in the appended claims.

In order that a clear understanding of this invention may be had, attention is hereby directed to the accompanying drawings, forming a part of this application by reference and illustrating, in Figures 1 to 15, inclusive, an earlier embodiment of this invention wherein the amplifier of the hearing-aid is shown as an electronic-tube circuit and illustrating in Figures 16 to 31, inclusive, a later modified embodiment having a transistor amplifying circuit employed therewith, but no claim of invention is made therein with respect to said amplifier circuit, per se, as they are conventional.

Referring specifically to the drawings, in which.

Figures 16, 16A, 17, 18, 19, 20, 21, 22:
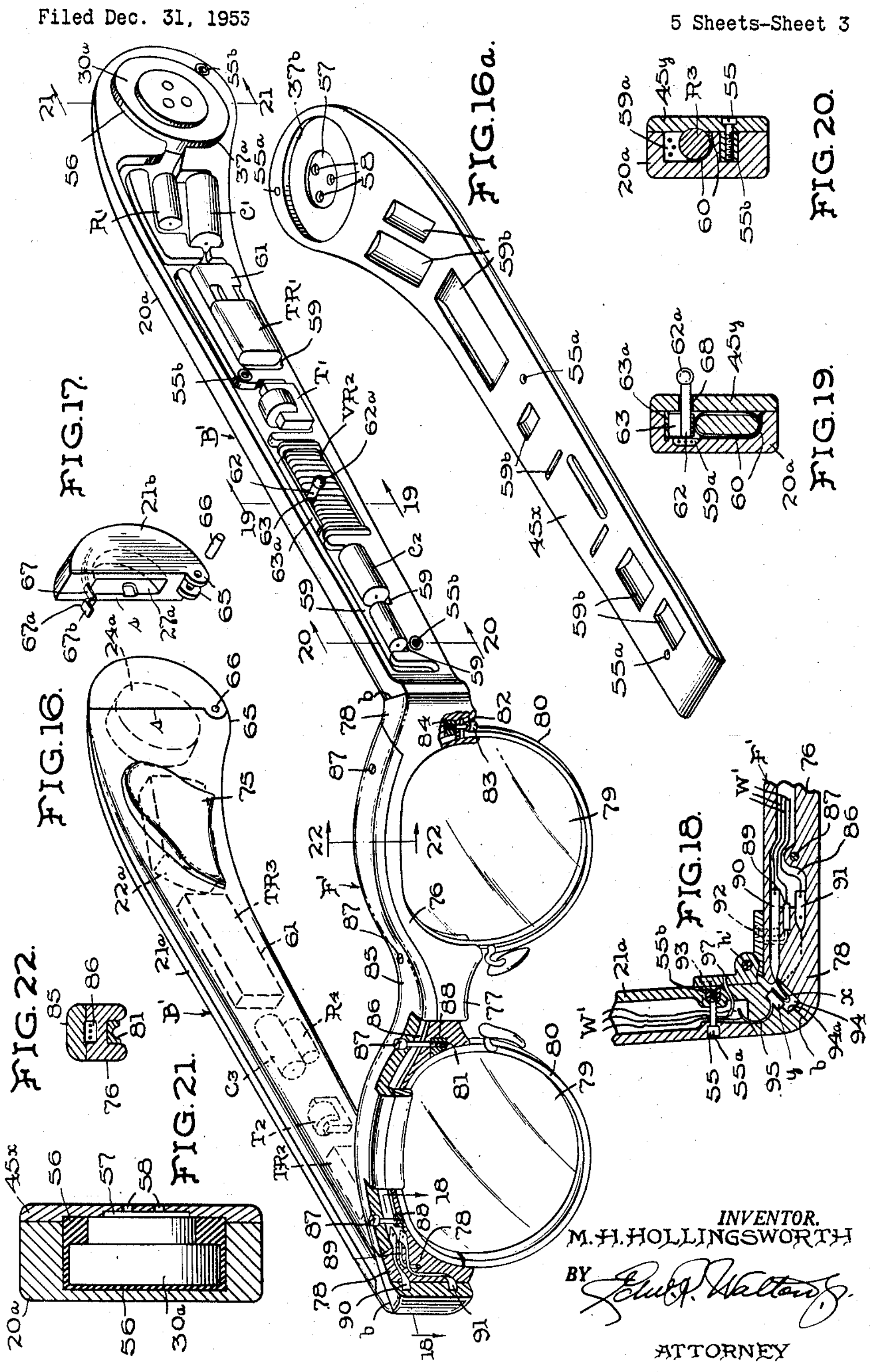
Figure 16 is a perspective view of a standard spectacles frame modified in accordance with my invention, the frontal-piece being partly in section and the cover plate of the left bow being removed to illustrate the assemblage of the parts and details of construction.
Figures 23, 24, 25, 26, 27:
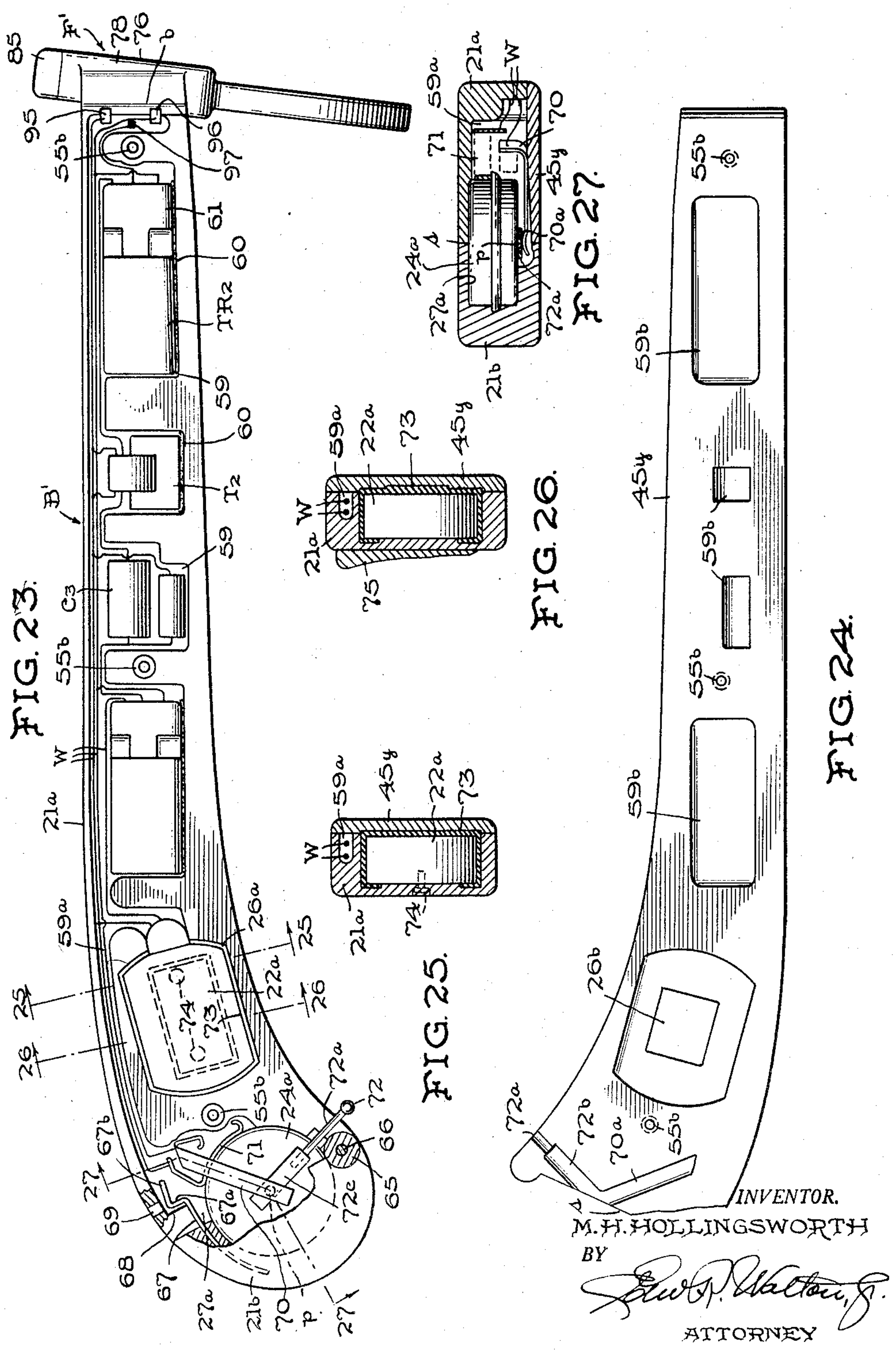
Figures 28, 29:
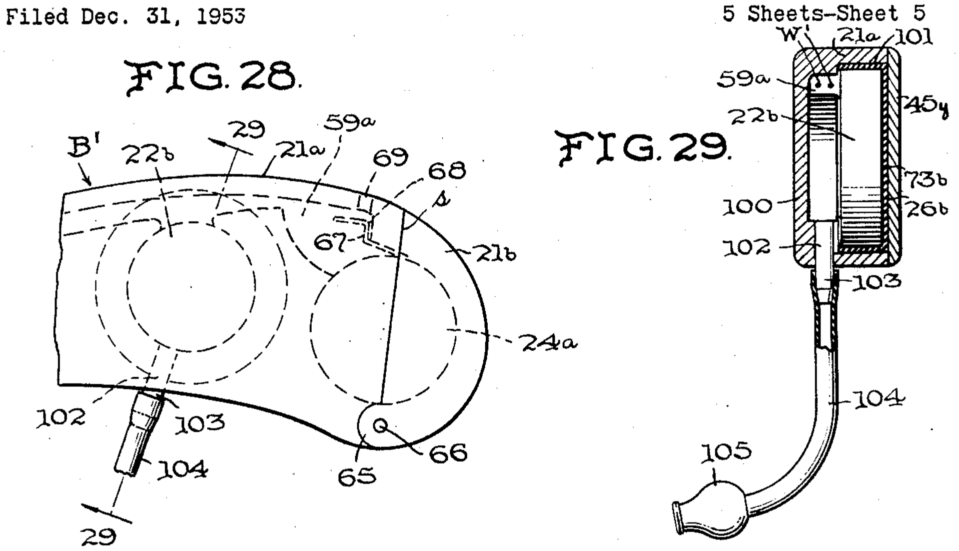
Figure 30:
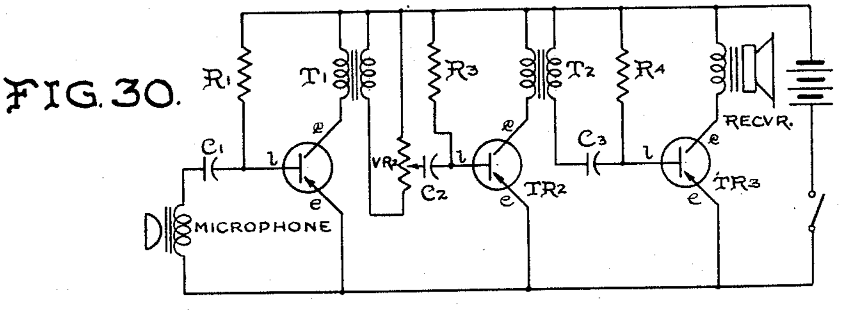
Figure 31:
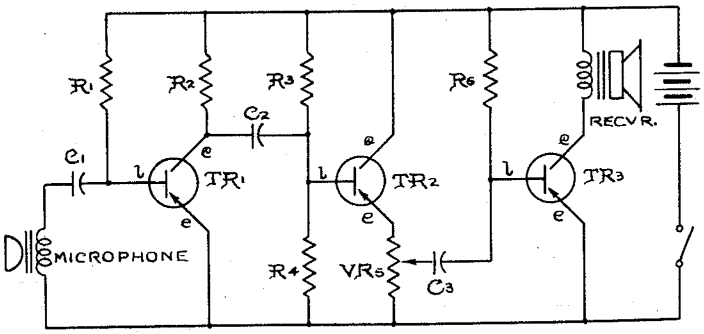

Figure $16^a$ is a perspective view of the removed cover-plate for the left bow;

Figure 17 is a perspective view of the hinged cover at the rear end of the right bow for permitting insertion and removal of the battery in said bow;

Figure 18 is a horizontal sectional view taken substantially on line 18—18 of Figure 16;

Figures 19, 20, 21 and 22 are transverse sectional views taken substantially on lines 19—19, 20—20, 21—21 and 22—22, respectively, through the spectacles frame shown in Figure 16 but with the side cover-plate (shown in Figure $16^a$) of the left bow in place;

Figure 23 is a side view of the spectacles shown in Figure 16, looking toward the right-hand bow thereof, but with its side cover-plate removed to illustrate the assemblage of parts therein and details of construction;

Figure 24 is a view of the side cover-plate for the right-hand bow and looking at the inner face thereof;

Figure 25 is a transverse sectional view taken substantially on line 25—25 of Figure 23 through the portion of the bow carrying a bone conduction receiver, said bow being shown with its side cover plate in place;

Figure 26 is a transverse sectional view taken substantially on line 26—26 of Figure 23 and shows an optional contoured pressure-pad secured to the inner face of the bow opposite the bone conduction receiver, said bow being shown with its side cover plate in place;

Figure 27 is a transverse sectional view taken substantially on line 27—27 of Figure 23, with the side cover plate of the bow in place, and showing the battery in place and the control switch;

Figure 28 is a fragmentary side view of the rear end of the bow or temple piece shown in Figure 23 but showing a modification wherein the end of the bow or temple piece has an air-conduction receiver installed therein;

Figure 29 is a transverse sectional view taken substantially on line 29—29 of Figure 28 with the addition of an ear tube applied to the end of the air-conduction receiver;

Figure 30 is a diagrammatic view of a transformer-coupled amplifier circuit used in connection with the form of the invention shown in Figures 16 to 29, inclusive; and Figure 31 is a diagrammatic view of a resistance-coupled amplifier transistor circuit which may be employed in the form of the invention herein disclosed.

Similar reference characters employed in this specification refer to similar parts throughout the several views of the drawings.

As stated in the above objects of the present invention, all of the components of the hearing-aid, the bone-conduction type or the air-conduction type, are incorporated within a supporting structure in the form of a spectacles frame (with one exception to be noted later) with some of the components or elements concealed within one of the temple-pieces or bows B of said frame and others concealed in the other of said bows, the electrical conductors W, connecting the hearing-aid elements in the two bows, being concealed in or by said bows and the frontal piece F of said frame.

I have found that in a hearing-aid device of the type outlined above, it is essential that the sound-wave pick-up unit or microphone (sometimes called a "transducer") must be located at a point adjacent an ear of the user of the device but no farther forward than immediately anterior of the ear in order to place it as far as possible from the mouth and nostrils of the user, when worn, and eliminate intolerable sounds caused from the breathing of the user and thundering deafening sounds caused by the coughing and speaking of the user (probably due to the rule that intensity of sound varies inversely as the square of the distance). By so locating the microphone within one side bow of the spectacles frame, I have discovered other advantages therefor—among which are (1) the microphone is in a more natural location for human hearing purposes thus requiring no unnatural movements of the user in an effort to detect sound or in vis à vis conversation, (2) affords better reception of the acoustical energy or sound-waves for maximum hearing efficiency, (3) permits the use of a telephone by the user in the normal manner of using telephones without being conspicuous, as heretofore, and (4) better distributes the weight by placing the microphone at the ear so as to receive support by the bow resting upon the ear, when the hearing-aid device is being worn. The location of the receiver should be adjacent the ear which it serves and, preferably, in the rear end portion of the other bow.

Figure 1:
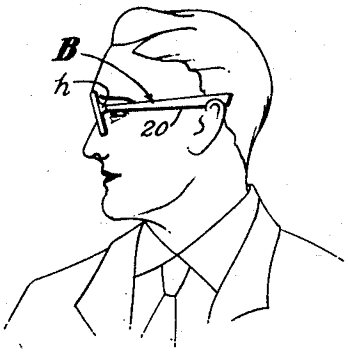
Figure 1 illustrates in side view a bone conduction type hearing-aid of my invention as it appears when worn.
Figure 2:
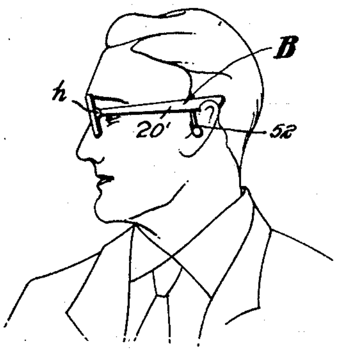
Figure 2 is a view similar to Figure 1 illustrating an air conduction type hearing-aid of my invention.

In carrying out this invention, the side bows B may comprise an elongated bar-like member of light weight material, such as a plastic material or of metal, hingedly connected at one end to opposite sides of the frontal piece F and of a length to extend for a distance in back of the ears of the wearer in a manner well known and shown in Figures 1 and 2 so as to conform, somewhat, to the curvature of the skull, and may have a widened and substantially flattened surface opposite the mastoid bones and frictionally grip thereagainst to hold the eye-glasses in position on the wearer yet allowing the same to be quickly and easily donned and doffed. The bows B may be fashioned or styled according to prevailing taste to have gaseous dimensions, providing such width and thickness as to accommodate therein all the elements of a hearing-aid, one type being shown in Figs. 3, 4, 12 and 14 and another in Figs. 11, 23 and 24; but, with the hearing-aid instrumentalities now available, this can be accomplished with spectacle frames now having public acceptance. Recent practice has been to produce, so-called, grip bows about one-half inch wide at their forward or hinged ends and about one inch, or more, wide at their rear ends which grip the skull at opposite points against the mastoid bones behind and removed from the ears. Such bows are now of adequate dimensions to have incorporated therein the parts of an operative hearing-aid (now available). The problem, however, is the manner of incorporating said elements in such frame of spectacles—that may be readily donned and doffer—so as to attain the objects of the invention and to facilitate the assemblage of said elements in the frame of the spectacles as to be readily susceptible of access for renewal and repair of parts. To this end, each bow B is formed with suitable recesses to receive the particular hearing-aid elements which are to be concealed in that particular bow; and, preferably, each bow is formed of separable parts, such as two longitudinal parts that may be separated to give access to the hearing-aid instrumentalities enclosed thereby.

Figure 3:
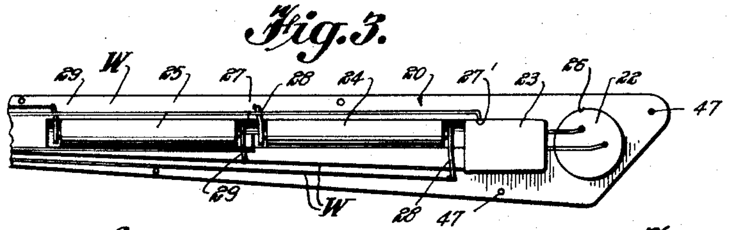
Figure 3 is a fragmentary side view of one form of my invention showing the interior of a separable section of one of the side bows of a pair of eye-glasses with its other separable section removed and showing certain parts of a hearing-aid mounted therein.
Figures 4, 5:
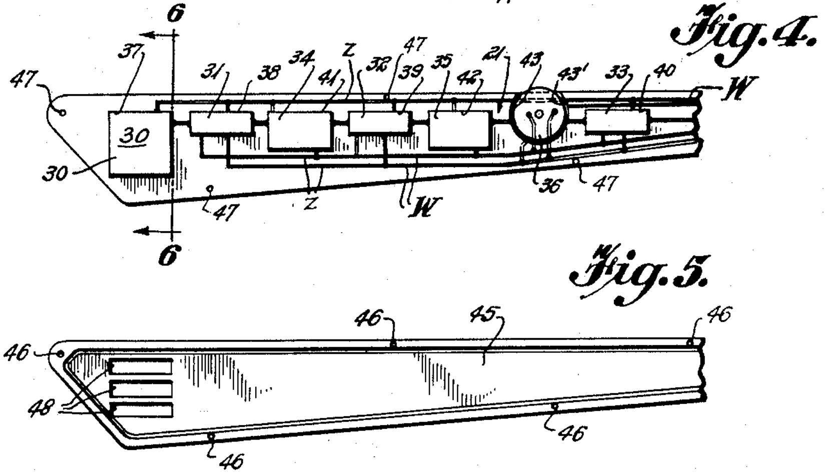
Figure 4 is a fragmentary side view of the interior of the corresponding section of the other side bow of the pair of eye-glasses with its other separable section removed and showing certain other parts of the hearing-aid mounted therein.
Figure 5 is a fragmentary side view illustrating the cover plate or other section of the bows and particularly showing a cover plate for one of the side bow parts which carries the microphone (30) of the hearing-aid as shown in Figure 4.
Figure 6:
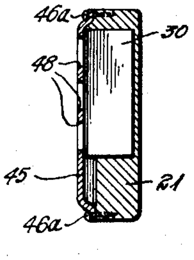
Figure 6 is a transverse sectional view of one of the hollow side bows with the cover in place, and is taken on the lines 6—6 of Figure 4.
Figures 9, 10, 11, 12, 13, 14, 15:
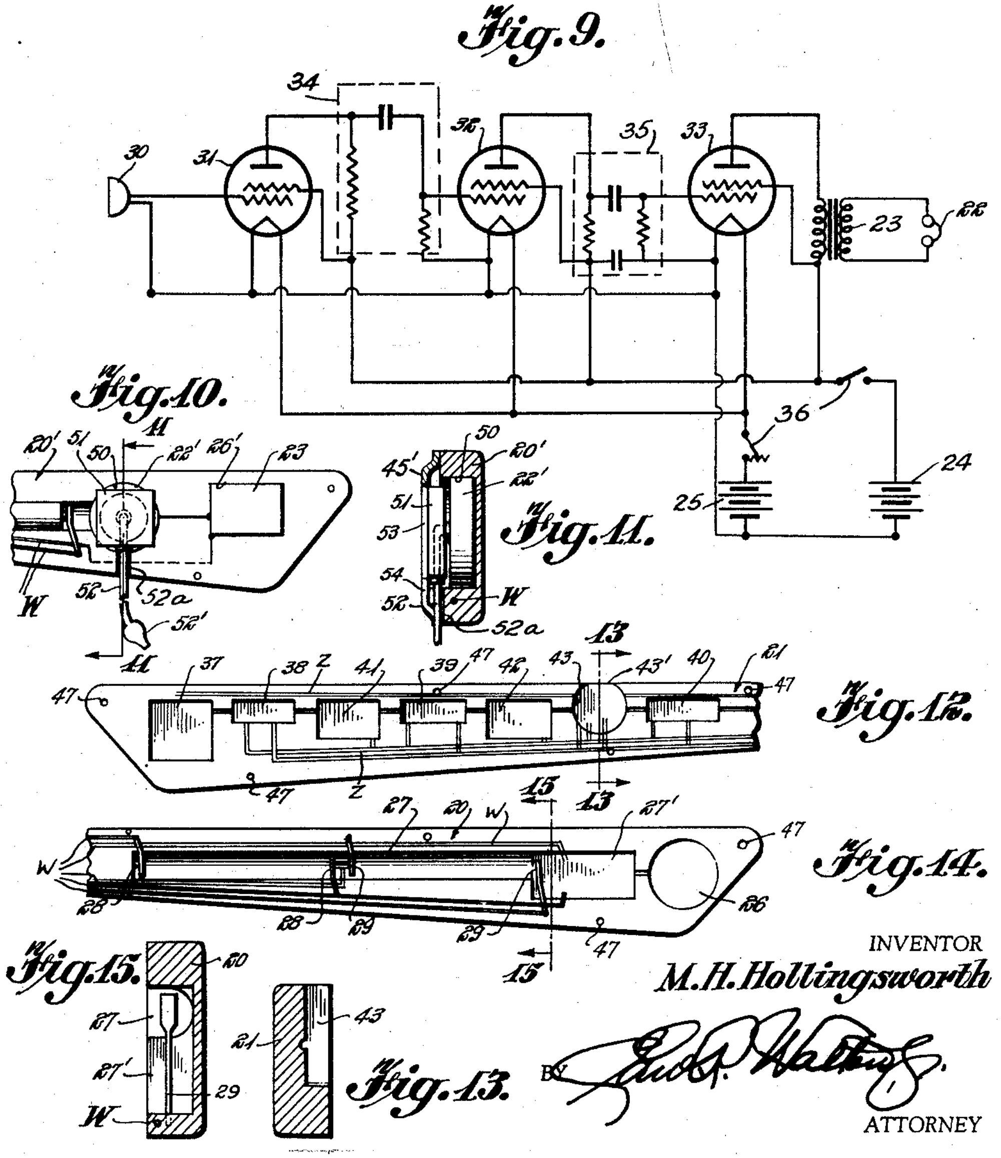
Figure 9 is one possible wiring diagram of a hearing-aid amplifier employable with this invention as shown in Figures 3, 4 and 7.
Figure 10 is a side view illustrating a modified arrangement of the interior of a rear portion of a bow of spectacles shown in Figure 3 with certain parts of a hearing-aid of the air conduction type mounted therein.
Figure 11 is a transverse sectional view taken on the line 11—11 of Figure 10, but with the cover plate in place.
Figure 12 is a view similar to Figure 4 but with the hearing aid elements removed from the cavities or recesses in which they are held.
Figure 13 is a transverse sectional view taken substantially on the line 13—13 of Figure 12.
Figure 14 is a view similar to Figure 3 showing the cavities or recesses, but with the hearing-aid elements removed therefrom and showing certain electrical connections to engage with batteries and a transformer.
Figure 15 is a transverse sectional view taken substantially on the line 15—15 of Figure 14.

One manner of accomplishing this is shown in Figs. 3, 4, 5, 12 and 14 wherein the bows B comprise, respectively, bar members 20 and 21 having their forward ends suitably hinger, at *h*, to the frontal piece F and each having one side face (preferably its outer face) hollowed or recessed to receive the hearing-aid elements and adapted to be closed by a complementary or conforming removable side cover-plate 45, shown in Figs. 5, 6 and 11. The cover-plates 45 may be thinner, as indicated, than the bow bars 20 or 21, and as indicated in Figs. 17 and 26, may have their inner faces correspondingly recessed to a depth as will assure the proper accommodation of the hearing-aid parts between the bars 20 and 21 and their cover-plates 45.

The bow bar 20 may be suitably recessed along its length to receive therein, the receiver 22, transformer 23, "A" battery 25 and "B" battery 24 of a hearing-aid. For instance, the bow bar 20 may be provided at or near its rear end with a circular opening or bore 26 (Figs. 3 and 14) in which a hearing-aid receiver 22 fits snugly, preferably, with the oscillating diaphragm of the receiver flush or protruding slightly through said opening to press against the mastoid temporal bone of a person wearing the eye-glass frame hearing-aid in the manner in which spectacles are worn; next, extending forwardly from near the recess 26 is a recess 27′ shaped to snugly receive the transformer 23; and, next, beyond the portion 27′, is an elongated recess 27 shaped to snugly receive in tandem therein an A-battery 25 and a B-battery 24 of the hearing-aid. Two pairs of spaced and suitable spring-finger contacts 28 and 29 are fixedly supported in the bow bar 20 to extend into the recess 27, as by being molded in the block or screwed or bolted thereto, the one pair 28 of the contacts resiliently pressing against the terminals on the opposite ends of the B-battery 24 inserted between them, and the other pair of spring fingers 29 resiliently pressing against the contacts of the A-battery 25 inserted between them.

The other bow bar 21 may be suitably recessed along its length as, for instance in Figs. 4 and 12, with a recess 37 at or near its rear end which snugly receives the microphone 30; is also provided, forwardly from the latter, with three recesses 38, 39 and 40, each shaped to snugly receive one of the three amplifying unit tubes 31, 32 or 33 (which may be electronic valves or tubes); is next provided with two recesses 41 and 42, preferably between the recesses 38, 39 and 40, for snugly receiving two resistor-condenser assemblies 34 and 35, respectively; and with a recess 43 to receive the volume control and switch 36. The recess 43 has an opening 43′ at the top of the bar 21 through which a finger wheel of the combined volume control and on-off switch 36 protrudes slightly so that it can be engaged and manipulated by the finger of a wearer of the hearing-aid.

Figure 7:
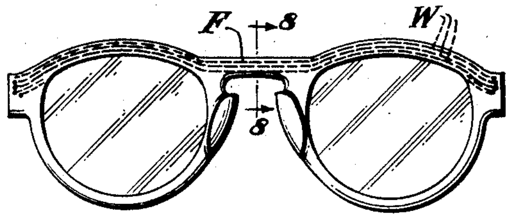
Figure 7 is a front view of a pair of eye-glasses showing in dash lines the hearing-aid conductors extending through the frontal piece of the eye-glass frame.
Figure 8:
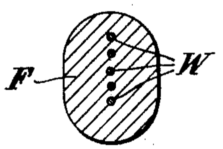
Figure 8 is a transverse sectional view taken substantially on the lines 8—8 of Figure 7.

All of the several parts of the hearing-aid are available and are connected electrically in a manner which is conventional. The wiring or the conductors thereof are diagrammatically indicated at W in Fig. 4, the conductors W extending in suitable channels *z* from the hearing-aid elements in one bow B of the eye-glass frame to the elements in the other bow through and along the front part F of the eye-glass frame as shown in Figs. 7 and 8. The circuits may be wire conductors placed in the channels *z* or molded in the bow bars 20 and 21 and the frontal piece F, or may be printed circuits, or some of each; or may be applied otherwise.

The cover-plates 45 for the bows B may be formed as complemental longitudinal sections thereof and may be grooved to slide into and out of covering position but are here shown as substantially flat plates, Figs. 5, 6 and 11, provided with a suitable number of apertures 46 in their rim portions to register with corresponding threaded holes 47 in the bow bars 20 and 21 to accommodate fastening screws 46ᵃ and, thus, retain and conceal the hearing-aid elements.

For better reception, the cover-plate 45 for the bow bar 21, which carries the microphone 30 of the hearing-aid, is provided with slots 48 where the microphone 30 is located so that sound waves have free and unobstructed access to the microphone through the slots 48. The slots 48 themselves are very inconspicuous in the cover plate; and, furthermore, the microphone and these slots are so located in the bow of the eye-glass frame that the slots will be partially masked by the upper part of the ear of the wearer of the aid while at the same time the ear of the wearer will be spaced far enough outwardly of the slots to give sounds free access to the microphone through the slots in the eye-glass frame bow. The cover plate 45 of the bow bar 20, carrying the receiver 22, does not require the slots 48.

The hearing-aid, so far described, having a receiver 22 which impresses mechanical vibrations directly against the wearer's mastoid temporal bone (through the covering skin, of course), follows the well known bone conduction system or method of transmitting sounds to the auditory nerves through the bones of the head.

As stated previously herein, my invention is also applicable to hearing-aids which operate in accordance with the air conduction systems or methods in which, instead of impressing mechanical vibrations on the bones in the head, a vibrating column of air is conducted to or into the canal of the ear of the user of the aid. Such air conduction type of concealed hearing-aid requires certain structural changes from the bone conduction hearing-aid construction above described with reference to the drawings. Figs. 2, 10 and 11 show these changes in structure that may be made to the previously described bone conduction type embodiment of this invention shown in Figs. 1, 3 and 14.

For instance, in the air conduction type hearing-aid construction, the bow bar 20' (see Figs. 10 and 11) carrying the receiver 22' has no aperture exposing the receiver on its inner face or side in order that it can contact the head of the wearer of the aid; but, preferably, the receiver 22' is so located in the bow bar 20' that it will be at or near the front of the ear of a person wearing the aid properly. To this end, the rearmost recess 26' in the bar 20' may be shaped to snugly receive the hearing-aid transformer 23 and a more forward recess 50 is provided to snugly contain the receiver 22' and a fitting 51. This fitting is designed to hold and maintain one open end of a hollow tube 52 opposite and exposed to the diaphragm of the receiver 22' so that vibrations of the diaphragm (oscillator) of the receiver 22' set up corresponding vibrations of the air (sound waves) in the hollow of the tube 52. This tube 52 extends from the fitting 51 through a slot 52$^{a}$ in the bottom of bow bar 20' and is of such length and shape that its lower open end will comfortably fit the ear and open into the canal of the ear of the wearer of the aid, when this hearing-aid is properly worn—that is, as a pair of spectacles is worn. Since both the receiver 22' and the air tube fitting 51 are retained and supported in the recess 50 provided therefor and the air tube 52 extends through an aperture or slot 52$^{a}$, the cover plate 45' for the bow bar 20' covers the same so that all that is visible of the hearing-aid is the very short and narrow tube that extends from the bottom of the bow bar 20' to the opening of the ear canal, as shown in Fig. 2. On the other hand, the cover plate 45' may be provided with an aperture 53 and slot 54 to receive the fitting 51 and tube 52 so that the fitting and tube may be applied to and removed from the receiver without removing the cover plate 45'. The fitting 51 snaps onto the receiver as it does in present hearing-aids. Tube 52 is preferably made of material, such as metal or suitable plastic, which does not bend easily but has a considerable range of bending allowance before breaking or not returning to its original shape. Suitable plastic materials of this character are well known. The ear end or tip 52' of the tube 52 is preferably shaped into the form of a small bulb similar in shape to the ear or tip ends on the ear tubes of stethoscopes.

The air vibration carries through an enclosed column of air clearly and with greater force in a diameter not over 1/16 or possibly 3/32 of an inch and, since in the present instance the distance to be traveled by the vibration would be not over two inches, tube 52 may have an inner diameter of not more than 1/16 of an inch or still smaller. However, there should be no sharp bends to diminish or obstruct the inner diameter of the tube which should always be the same. The air tubes now used with the hearing-aids now on the market are necessarily at least double the diameter (inside diameter) of the tubing I may employ with my invention. The plastic tube in conventional use now is at least ten inches in length and sometimes a foot in length. This long column of air causes a reduction in volume in comparison with a short length. Then the serious trouble is that, in use, the plastic tube is subject to being sharply bent and the walls mashed or crushed together. Sometimes the walls are mashed almost shut and frequently kinks and short bends become formed therein. Therefore, in connection with my invention, the tube 52, of plastic, metal or other suitable material, running from the receiver 22' to the ear canal, will have an outer diameter not much in excess of 1/16 of an inch. Of course, the diameter of the tube may be varied over a considerable range, but the fact of the short length and very small diameter of the tube adds to the concealment feature that is so extremely important.

Of course, there are other ways of incorporating certain of the hearing-aid parts or elements in the bows of the eye-glass frame such as, for instance, embedding certain of them, as are susceptible, in the bows 20 and 21 while the latter are being cast or molded, although by so doing their removability for repair and replacement is impaired; but the tube 52 may also be cast integral with the bow 20' with one end of its air passage extended into the recess 50 and opposing the vibrating diaphragm of the receiver 22' so as to cause the air column in the tube to vibrate in harmony therewith and the sound waves will be delivered to the ear canal of the wearer of the aid.

If, for any reason, a person prefers to wear the receiver of the hearing-aid directly in the ear, as is now customary with hearing-aids, then, instead of the tube 52, two short conducting wires running from the bow of the eye-glass frame to the receiver may be substituted for the short tube 52. However, in such case an "ear-mold," now used, is required and it, and the receiver carried thereon, will not be concealed, but there will be no long and conspicuous wires extending to the receiver in the ear from a hearing-aid unit worn on the wearer's clothing.

Conventional and known circuits may be used in all modifications. However, the hearing-aid instrumentalities described above in connection with Figs. 2, 3, 12 and 14 are shown in a conventional electronic-tube amplifier circuit, diagrammatically illustrated in Figure 9, wherein the microphone is indicated at 30, the receiver at 22, the A-battery at 25, the B-battery at 24, the transformer at 23, the electronic valves or tubes at 31, 32 and 33, the resistor-condenser assemblies at 34 and 35 respectively, and the volume control and cut-off switch at 36. Wherever suitable, the conductors of the circuit and the resistors may be printed in the well-known manner, if desired, or wires may be used, as preferred.

Further, instead of the circuit and its component parts described and shown in connection with Figs. 3, 4 and 9, I may use a transistor circuit employing the "juncture type" transistor, shown in Figs. 30 and 31, as the amplifying means of said hearing-aid. The earlier developed "point type" transistors have proven unsuitable for hearing-aids, whereas the juncture type transistors have a wider control range and a higher amplification factor (i.e., gain) much freer of distortion and, consequently, less noise characteristics than the point type transistors. The advantageous characteristics of a transistor are, as now well known, among others, its minuteness, its low power requirement (about one-millionth of that of a vacuum-tube circuit to perform the same work), its lightness in weight, and its non-use of an A-battery for heating purposes, thus requiring no power to send the electrons on their way and developing no deteriorating heat, its high resistance to shock and vibrations, and its long life, many times that of a vacuum-tube electronic valve. Because of the minuteness in size of transistors and of the components in a transistor amplifying circuit, greater compactness and reduction in weight and size of a spectacles concealed hearing-aid is obtained than with the electronic tube amplifying circuits as in Fig. 9; however the invention as outlined above remains otherwise the same.

The transistor circuit employed may be the transformer-coupled amplifier shown in Fig. 30 or the resistance-coupled amplifier shown in Fig. 31. Since these transistor amplifying circuits are now well known in the art no further description is thought to be necessary in view of the showing in Figs. 30 and 31, except to say that, while the resistence-coupled transistor circuit of Fig. 31 may be provided with components of smaller size and lighter in weight than the transformer-coupled transistor circuit of Fig. 30, such resistance-coupled circuit is less efficient than said transformer-coupled transistor circuit. Also while the transformer-coupled transistor circuit may be varied or modified to employ only one transformer, I have selected for illustration the employment of the most difficult transformer-coupled transistor amplifying circuit for hearing-aids to show that the same may be packaged into a spectacles frame; and in Figs. 16 to 29, I have illustrated my improved manner of doing so within the general scope of the disclosure of Figs. 1 to 15 inclusive.

In Fig. 16 is illustrated, on actual scale for clarity, the frame of spectacles having bow bar members B′ and a frontal piece F′ similar to members B and F shown in Figs. 2, 3, 6, 10, 11, 12, 14 and 15 but differently styled to better adapt it to the improvements therein contained, and said bows B′ are slightly differently recessed or compartmented to receive therein the component elements of the transistor circuit shown in Fig. 30. These bows B′ each may be comprised of two longitudinal separable sections, the left-hand bow including bar member 20ᵃ and its removable cover plate 45ˣ and the right-hand bow including the bar-member 21ᵃ and its cover-plate 45ʸ. The bar members 20ᵃ and 21ᵃ are preferably thicker than their cover-plates and are each hinged at their forward ends to the ends of the frontal piece F′, respectively, as at *h*′, to fold behind the frontal piece after the manner of conventional eyeglass frames. The outer side faces of the bar members 20ᵃ and 21ᵃ are formed with recesses or cavities in which are lodged and secured the hearing-aid elements, these recesses being interconnected by a channel in which may be disposed the conductor wires W′. Said recessed faces of said bars 20ᵃ and 21ᵃ are covered by their respective cover-plates which may be secured in position by screws 55 extended through holes 55ᵃ in said cover-plates and registering with internally threaded member 55ᵇ embedded in the bars 20ᵃ and 21ᵃ.

As in the case of the microphone 30 (Fig. 4), the microphone 30ᵃ, in this modification, is positioned in the rear end of the left-hand bow bar member 20ᵃ and is mounted in a cup-like rubber insert 56 that fits into a circular cavity 37ᵃ in said bar member 20ᵃ (Figs. 16 and 21). The side cover-plate 45ˣ of the bar member 20ᵃ may be correspondingly recessed, at 37ᵇ, to receive a marginal rim portion of the insert 56 and should be recessed sufficiently, as at 57, to allow clearance for the diaphragm of the microphone, the wall of the recessed portion 57 being perforated with suitable holes 58 to expose said diaphragm to ambient sound energy.

Forwardly of the microphone receiving cavity 37ᵃ, the outer face of the bar member 20ᵃ is provided with a series of suitably shaped recesses 59 to receive and retain, in the order given, the resistor R1 and the condenser 1, transistor TR1, transformer T1, the variable resistor VR2, condenser C2 and the resistor R3 of the transistor circuit diagrammatically shown in Figure 31. These cavities 37ᵃ and 59 are connected by a channel 59ᵃ extending longitudinally of the bar member 20ᵃ and communicating with each of the cavities in order to receive and retain the electric wiring harness properly connecting these instrumentalities, said wiring not being shown in Fig. 16 to avoid over-complication of the illustration. The instrumentalities, just stated as disposed in the concavities 59 of the bar 20ᵃ, are held in place by an adhesive 60 of a type that may be dissolved or softened when it is desired to replace any of the instrumentalities; and for this purpose it has been found an adhesive "M37" manufactured by Minnesota Mining Company is entirely satisfactory. It is understood, of course, that the transistor TR1 is not cemented in place but only its socket 61. The inner surface of the cover-plates 45ˣ and 45ʸ may be also—and preferably are—provided with cavities 59ᵇ so as to accommodate any protruding portion of the hearing-aid instrumentalities mounted in the bar 20ᵃ, thus enabling the thickness of the bar 20ᵃ to be somewhat reduced.

The transistor TR1 is shown as removably mounted in a socket or holder 61 so that the transistor TR1 may be replaced when necessary and to this end the cavity for the transistor is large enough to accommodate it as well as the socket 61 and permit certain movement allowing the insertion and removal of the transistor.

The variable resistor VR2 is shown as being of the sliding contact type having a stationary coil, whose convolutions are oblong and closely wound (see Figs. 16 and 19), and a contactor 62 in the form of a cylindrical member slidable transversely over the outer surface of said coil so that it may yieldably lodge in the valleys between said convolutions. The contactor 62 is secured to the intermediate portion of a bow-leaf spring 63 whose ends bear (with some compressive tension) against an overlying metallic plate 63ᵃ fixed to the upper wall of the channel 59ᵃ. A handle or finger piece 62ᵃ projects from the contactor 62 and extends through and beyond an elongated slot 64 in the cover plate 45ˣ, thus enabling the volume of the electrical hearing-aid to be controlled very easily and quickly by a slight touch of the finger of the wearer in a very inconspicuous manner.

The right-hand bow member 21ᵃ of Fig. 16 has mounted in its rear end portion a bone-conduction receiver 22ᵃ at a point slightly forward of its extremity so as to lie in a position more directly over the ear of its wearer, the battery 24ᵃ being removably mounted in the rear portion of the bow member 21ᵃ just beyond and rearwardly of said receiver 22ᵃ, thus affording the provision of a very simple means for quickly inserting and removing the battery. The bow bar 21ᵃ is molded similarly to the bow bar 20ᵃ—that is to say, it is formed in its outer side face wtih a recess 27ᵃ at its rear extremity to receive the battery 24ᵃ, is next formed with a recess 26ᵃ forward toward its hinged end (adjacent the recess 27ᵃ) to receive the receiver 22ᵃ and, continuing forwardly in the order given, is formed with said series of recesses or cavities 59 shaped to receive the transistor TR3 and its socket 61, then next to receive the resistor R4 and condenser C3, then next to receive the transformer T2 and, finally, to receive the transistor TR3 and its socket 61, said recesses communicating with a channel 59ᵃ extending longitudinally of and in said side face of said bar 21ᵃ for receiving and retaining the wiring harness W′.

However, in providing the bow member 21ᵃ with the battery receiving recess 27ᵃ therein, its rear end portion 21ᵇ is separately molded in the shape, as indicated in Figs. 17 and 23, to divide the recess 27ᵃ and to provide a hinged end cover at the end of said bar member 21ᵃ. The exterior side surfaces of the end cover 21ᵇ will be such as to form continuations of the inner side face of the bow member 21ᵃ and of its outer side face, when the cover plate 45ʸ is in its closing position. The inner face of the end cover 21ᵇ, adapted to oppose and be normally contiguous against the extremity of the bar 21ᵃ, as at *s*, is recessed inwardly to form a substantially semi-circular cavity complemental to that portion of the recess 27ᵃ in the end of the bar 21ᵃ so as to house the battery 24ᵃ when the cover 21ᵇ is in its closed position as shown in Figs. 16, 23 and 27; but, when the cover 21ᵇ is open, a portion of the battery is accessible to the fingers to be withdrawn from the complemental portion of the concavity 27ᵃ in the end of the bar 21ᵃ without the necessity of removing the side cover plate 45ʸ of the right-hand bow 21ᵃ, thus affording a very quick insertion and removal of the battery when necessary. The battery, here shown, is the smallest mercury battery at present obtainable for the purposes of this invention and is made by P. R. Mallory & Co. and, as shown, is disc-like.

The surfaces *s* of the battery cover 21ᵇ and its bar member 21ᵃ are formed at one end thereof with inter-engaging perforated ear portions 65 through which a hinge pin 66 extends to hingedly mount the battery cover 21ᵇ on the bow 21ᵃ although any suitable hinge means may be employed.

A spring latch means is provided for the battery cover 21ᵇ and, preferably, comprises a resilient metal strip 67 molded in said cover 21ᵇ at a point distal to its hinged pin and extending outwardly from a wall of the cavity 27ᵃ therein for a distance and, then, is bent laterally and outwardly to form a detent 67ᵃ of such depth as will engage behind a shoulder 67 within the cavity 27ᵃ in the bar $21^a$. The detent portion $67^a$ has its extremity laterally extended therefrom to form a tab $67^b$ underlying a small opening 69 in the upper surface of the bar $21^a$. By inserting a small wire, such as a hairpin or the like, into the opening 69, the tab $67^b$ may be depressed to move the detent $67^a$ inwardly of the cavity $27^a$ and out of engagement with the shoulder 68, thus releasing the cover $21^b$ and permitting it to be swung on its hinge pin 66.

Also, molded in the bar $21^a$ are electrical terminal contact members 70 and 71 projecting into the cavity $27^a$ and arranged for contact with the poles of the battery, these contact members being of resilient spring-like material. The contact member 70 extends radially of and to one side of the cavity $27^a$, as at $70^a$, to engage a pole of the battery at its axial center; and the contact member 71 has an arcuate portion conforming substantially with the circumference of the cavity $27^a$ to engage the peripheral portion or side wall of the battery to form the circuit. On the underside of the bar $21^a$, adjacent the hinge 66, is a push-pull rod 72 slidably extending substantially radially of and into the battery cavity $27^a$ through an opening $72^a$ in said bar and into guide slot $72^b$ in the side cover-plate $45^y$ to be adjacent one of the side walls of said cavity. The inner end of the rod 72 carries, as an extension thereof, a wedge-like member $72^c$ of dielectrical material positioned between the spring-like terminal 70 and the pole *p* of the battery $24^a$ to disconnect the circuit through the battery, when the rod is pushed inwardly as shown in Fig. 23, and to cause the spring contact 70 to engage the terminal *p* of the battery, when the rod is pulled outwardly, moving the member $72^c$ sufficiently from under the terminal 70.

As more clearly shown in Fig. 23, the bone-conduction receiver $22^a$ is mounted in the cavity $26^a$ in the bow bar $21^a$ with rubber lining 73 interposed between the surfaces thereof, except at its surface opposing the inner wall of said cavity which engages the mastoid bone of the wearer, and is held rigidly to said inner wall by screws 74. When found necessary, as will be later explained, a contoured pressure pad 75 may be cemented to the inner face of the bow bar $21^a$ directly opposite the receiver $22^a$ as shown in Fig. 26.

Similarly, as in connection with the left-hand bow member $20^a$, the sockets 61 of transistors TR2 and TR3, the transformer T2, and the resistor R4 and condenser C3 are cemented in their respective cavities or recesses $59^a$ of the bow bar member $21^a$ as shown in Fig. 23; and the inner face of the side cover plate $45^y$ may be recessed, as indicated at $26^b$ and $59^b$, Fig. 24, to complement the recesses $26^a$ and $59^a$.

While the invention herein disclosed may be adapted to the frame of spectacles of various stylings, the style shown in Fig. 16 is particularly adapted therefor, wherein its frontal piece F comprises a main molded bar 76 formed to provide an intermediate nose bridge 77 and having its end portions 78 of generous dimensions, between which, the bridge 77 eyeglass lenses 79 are mounted in metallic lens-holding bands 80. These bands 80 are each suitably set within grooves 81 on the underside of the frontal bar 76 and are in the form of split rings, one end of which carries a perforated lug 82 through which a screw 83 extends and threads into a suitable threaded member or nut 84 molded in the frontal bar 76. The top edge face of the frontal bar 76 is made with a separable piece or cover 85 that extends across the length of the frontal bar 76 for a distance short of its end portions 78. The surface of the frontal bar 76 opposing the underface of the cover 85 is grooved for its length to provide a channel 86 in which may be lodged wiring (not shown) of the electrical circuit, shown in Fig. 30, inter-connecting the hearing-aid instrumentalities carried in the temple pieces or side bows of the spectacles frame. The separable cover 85 of the frontal piece is held in its closed position thereon by screws 87 extending therethrough and threadedly engaging suitable threaded members or nuts 88 molded in the frontal bar 76.

As can be seen particularly from Figs. 16 and 18, the end dimensions 78 of the frontal bar are made of very generous proportions for two purposes: (1) to provide a supporting body for terminal members 89, 90 and 91 which are molded in each end 78 of the frontal piece, respectively; and (2) to provide substantial supports and abutments for the hinged ends of the bow members $20^a$ and $21^a$, respectively. The opposing end faces of said ends 78 of the frontal piece and of said bow bars are beveled, at *b*, to form a right-angle joint and the leaves of their metallic hinges *h'* are secured in position to their inner side surfaces by the screws 92 and 93, respectively, in a conventional manner.

The contact terminal members 89, 90 and 91 in each end 78 of the frontal piece are resilient metal strips and each has one of its ends extended into the channel 86 of the frontal piece; and the other end portions of said terminal members 90 and 91 extend into a recess 94 in the beveled face of its end portion 78 of the frontal piece with said extended end portions preferably U-shaped as at *x*, to form a resilient contact, while the other end portion of each terminal member 89 extends through the inner side face of the frontal piece and is electrically connected to a leaf of its adjacent hinge *h'*. The forward beveled end of each of the bow bar members $20^a$ and $21^a$ is provided with recesses $94^a$ complementary to the recesses 94 in the beveled faces of the ends 78 of the frontal piece. Terminal contact members 95, 96 and 97 are molded in the forward end portions of each bow bar $20^a$ and $21^a$ to cooperate with the terminals 90, 91 and 89, respectively, and each has one of its ends extending into the channel $59^a$ of the bow bars $20^a$ and $21^a$ to which portions of the circuit shown in Fig. 30 are connected as more particularly shown in Fig. 23. The other end of each terminal member 97 is electrically connected, as by soldering, to the adjacent leaf of its hinge *h'*, while the other ends of the contact members 95 and 96 extend into the recess $94^a$ of their respective bow members and are formed with pads *y* positioned to engage the spring contact pads *x* of terminal members 90 and 91, respectively, as particularly shown in Fig. 18, when the bow members are fully open. Thus, when either temple piece or bow member of the spectacles is folded, two of the contacts are broken disconnecting or disestablishing the circuit and preventing acoustic feedback between the receiver and the microphone, when the spectacles are not being worn by the wearer and if, for any reason, the cut-off switch, indicated by the push-pull rod 72, is not operated to disconnect the battery. These contact pads *x* and *y* are arranged to wipe one over the other when the bows are moved to and from open position, thus assuring a good electrical connection.

As will be noted particularly from Fig. 16, the end or corner portions 78 of the frontal piece F' are very sturdy which results in providing a positive stop abutment for the bows when the latter are opened fully from a folded position. This restriction to the opening of the bows can be predetermined for each user of a particular hearing-aid, in accordance with this invention, by selecting a spectacles frame having a frontal piece of proper size as will assure proper pressure contact of the receiver $22^a$ against the mastoid bone when the bows are fully open. Should, however, in some cases, this proper contact be difficult of attainment, a pad 75—properly contoured for the particular wearer—may be applied, as by cementing, to the inner side of the bow directly opposite the receiver $22^a$. Because of the present construction, with or without the pad 75, the broad width of the bow, carrying the receiver $22^a$, contacts the head over a wide area and assures proper transmission of the sound vibrations to the bone structure of the head of the wearer.

Should it be desired to employ an air-conduction receiver $22^b$, instead of a bone-conduction receiver $22^a$, with the form of the invention shown in Figs. 16 and 23, this may be done with slight modification as shown in Figs. 28 and 29. To this end, the bow member or temple piece, carrying the receiver, should be thickened approximately 1/16 of an inch to accommodate the added thickness of the air-conduction receiver assembly; and the recess or cavity in the bow bar 21$^{a}$ will be fashioned to provide an air chamber 100 adjacent the inner wall (Fig. 29) of said bow bar and beyond which, toward the outer face of said bow bar (or its cover plate 45$^{y}$), a slightly larger chamber 101 is formed to receive the air-conduction receiver 22$^{b}$ having its walls surrounded by a rubber lining 73$^{b}$ except on its face opposite the air chamber 100 and to which chamber the diaphragm of said receiver is exposed. The air chamber 100 is provided with an outlet passage 102 (which may be in the form of a substantially rigid tube molded in the bar member 21$^{a}$) having one end extended therefrom to form a nipple 103 projecting downwardly from the under face of said bar. A relatively short piece of semi-rigid tubing 104, as explained in connection with Figs. 2 and 10, may be fitted on the nipple 103 and carries at its other end a hollow ear plug 105 shaped for insertion into the ear canal of the wearer.

It is to be understood that the receiver and microphone herein shown and described may be located in either the right or left hand bow as may be required or desired in any situation, but the microphone should be in one bow and the receiver in the other bow, when monaural hearing aid is provided, or they may be disposed in the same bow, when binaural hearing aid is desired—provided proper spacing between the microphone and receiver is maintained. Also, as a suggestion, the spectacles frame may be molded of nylon which will give support and rigidity necessary for the frame. It should be observed that all of the hearing-aid instrumentalities herein shown and described are available on the market and no claim is made to the transistor hearing-aid circuits per se.

It will be manifest from the above that the objects of the present invention are attained by the devices herein shown and described which produce an operable hearing-aid concealed in a spectacles frame overcoming all of the objections to hearing-aids now in use and eliminating the embarrassment hard-of-hearing persons encounter in the use of the present hearing-aid.

Having thus described my invention and the manner in which the same may be performed, it is to be understood that many changes may be made in the construction and arrangement of parts from those herein disclosed and described and that my invention is not to be limited to such details of construction but only by the scope of the appended claims.

That which is claimed as new is:

1. In a hearing-aid, the combination with an eyeglass frame having rearwardly extending side temple bows, the rear end portion of each of said bows having a substantially flattened surface adapted to be located at and opposite the mastoid temporal bone of a wearer of said frame when worn, of a recess in said flattened surface of one of said bows that will be facially opposite said bone, a hearing-aid receiver removably disposed in said recess and protruding slightly from said recess, said bows being adapted to hold the said frame in position on the wearer and shaped to hold said receiver in position against the wearer's head at said mastoid temporal bone, a recess in the other bow and positioned to be adjacent the proximate ear of the wearer and communicating through its outer face with the atmosphere exterior of said bow, a microphone removably disposed in said last mentioned recess, and an electrical amplifying circuit incorporated within said frame and operatively connected with said receiver and microphone.

2. In a hearing-aid, the combination with an eyeglass frame having side temple bows extending rearwardly from a frontal lens-supporting piece and an electrical hearing-aid system incorporated within said frame, of an internal recess in the rear end portion of one of said bows substantially overlying the ear of the wearer, when the hearing-aid is worn, a hearing-aid receiver of the air-conduction type removably supported and housed within said recess and connected in said system, an air sound-wave conduit extending from said bow and having one end communicating with said receiver and its other end extending exteriorly of said bow and insertable into the exterior auditory canal of the ear of the wearer, and a microphone housed within an internal recess in the rear end portion of the other bow to be juxtaposed with respect to the adjacent ear of the wearer and connected in said system.

3. In an audiphone as a hearing-aid, a spectacles frame having lens-supporting means and a pair of temple bows having extensions that project rearwardly of the user's ears, when worn; an electrically powered hearing-aid including a receiver, a microphone and a battery, all electrically interconnected into a hearing-aid system and at least the microphone and said battery being contained in said bows, said battery being removably disposed in a cavity at the rear end of one of said bows, which cavity opens through said end of the bow, and a removable cover member for said open end of said cavity adapted to cover said battery and, when removed, to expose said battery for removal from said cavity.

4. The subject-matter of claim 3, wherein said rear end portion of the bow containing the battery is bisected through said cavity to form a separate end part containing the other portion of said cavity, and a latch means cooperating with said bow and said end part to removably hold said end part in position to house said battery therein, whereby said battery is exposed to ready access for quick removal and replacement when said end part is moved to open said cavity.

5. The subject-matter of claim 3 wherein there are two electrical contact members disposed in said cavity and positioned to make electrical contact with the battery when the latter is inserted in position in said cavity, one of said contact members being a resilient member positioned to lie along one side wall of the cavity and biased to contact a pole of the battery, and a member reciprocally mounted in said bow and extending into said cavity and positioned to be interposed between said contact member and the battery, said reciprocal member having a part positioned externally of said bow for manual access to effect reciprocation of said reciprocal member, whereby said contact is moved out of electrical engagement with the battery upon one movement of said reciprocal member and will move into electrical engagement with said battery upon another movement of said reciprocal member.

6. A spectacles contained hearing-aid comprising an eyeglass frame with side temple bows, the rear end portion of one of said bows being bisected transversely, said bisected portions being hinged together and having their opposing faces forming with aligning cavities, when juxtaposed, to provide a chamber to receive and house a removable hearing-aid element, and means releasably maintaining said bisected portions in juxtaposition.

7. The subject-matter of claim 6 wherein said releasable means comprises a resilient tongue-like member carried by one of the bisected parts of the bow and has a detent portion extending into the cavity of the other of said parts to latchingly engage a cooperatively positioned keeper member therein, the free end extremity of said detent portion having a lateral tab thereon underlying a small opening in said bow through which an implement may be inserted to contact said tab and to press said detent out of latching engagement.

8. A pair of spectacles comprising a frontal lens mounting piece and side temple bows of molded material, said bows being hingedly connected to the end portions of the frontal piece, respectively, to allow said bows to fold inwardly with respect to the frontal piece; the adjacent hinge portions of said frontal piece and said bows having considerable width and having their opposing surfaces beveled to form restricting abutments to the unfolding movement of said bows; an electrical hearing-aid system contained within said bows and frontal piece and having its elements electrically interconnected with the connections thereof within said bows and frontal piece; said electrical connection including terminal members molded in said end portions of the frontal piece, respectively, and each having one of their ends extending into a channel within the frontal piece and their other ends formed into resilient yieldable contact pads disposed in a recess in the beveled end face of the frontal piece, and further including other corresponding terminal members molded in the hinged end portions of the bows, respectively, and each having one of their ends extending into a channel within their respective bows and their other ends formed into contact pads extending into a recess in the beveled end of their bows and positioned to have a wiping make-and-break contact with the yieldable contact pads of said terminal members in the frontal piece, when said bows are unfolded and folded.

9. The combination with an eyeglasses-lens frontal-piece; of a wearable self-contained hearing-aid structure for mounting to the frontal-piece comprising a pair of side spectacle temple members adapted to be attached to said frontal-piece, each temple member having a hollow portion serving as a housing; a hearing-aid assembly including a microphone, an electrical amplifier means, having a volume control, and a receiver with at least the microphone, amplifier means and its volume control disposed in the housings of said temple members; means electrically connecting said instrumentalities of the hearing-aid assembly in an operative system; one of said housings having a battery receiving chamber therein and terminal contacts in said chamber connected in said system to be contacted by said battery when the latter is inserted into said chamber; means mounting the microphone within and at the rear end portion of one temple member to be exposed to ambient sound waves and means carrying the receiver at the rear end of the other temple member so as to locate said microphone and receiver adjacent the ears, respectively, of the user, when worn; and means for mounting the said temple members to said frontal-piece to distribute the weight of the hearing-aid assembly to the frontal-piece, when worn in spectacle manner; said receiver having means positioned to convey intelligible sound therefrom to the audible-responsive sensitivity at an ear of the user, said volume control having an operable part exterior of its temple member.

10. In an audiphone, as a hearing-aid, a spectacles frame having lens-supporting means and a pair of side temple-bows provided with extensions that project rearwardly of the user's ears, when worn; an electrically powered hearing-aid including a receiver, a microphone, a source of electrical energy and an amplifying circuit, all electrically interconnected into a hearing-aid system and at least the microphone, source of energy and amplifying circuit, and their interconnections, being incorporated in said frame and concealed by the outer surfaces thereof; said microphone being disposed in one of said extensions of one of said bows remote from the lens-supporting means and positioned therein no farther forward than immediately anterior of an ear of the user, when donned, and the receiver being disposed within the other of said temple-bows and positioned to be adjacent an ear of the user, when donned; and a relatively short hollow flexible tube projecting from said receiver to extend into the meatus of the ear adjacent said receiver.

11. A new article of manufacture, as set forth in claim 9, further characterized by the temple-members being hingedly attached to the frontal-piece to allow said temple-members to fold inwardly with respect to the frontal-piece and by the electrical means, interconnecting the hearing-aid instrumentalities, extending through the frontal-piece, said electrical connecting means having cooperating make-and-break terminal contacts mounted at the adjacent hinged ends of said temple-members and said frontal-piece and positioned to make contact, when said temple-members are unfolded in wearable position, and to break said contact, when either or both of said temple-members are folded.

References Cited in the file of this patent

UNITED STATES PATENTS

| | | |
|---|---|---|
| 1,154,069 | Soret | Sept. 21, 1915 |
| 2,207,705 | Cox | July 16, 1940 |
| 2,242,118 | Fischer | May 13, 1941 |
| 2,613,282 | Scaife | Oct. 7, 1952 |

FOREIGN PATENTS

| | | |
|---|---|---|
| 491,677 | Great Britain | Sept. 7, 1937 |
| 840,622 | France | Apr. 28, 1939 |
| 990,602 | France | Sept. 24, 1951 |

OTHER REFERENCES

Article by Bardeen and Brattain in Physical Review for July 1948, pages 230–233.